(12) United States Patent
Yang (10) Patent No.: US 6,904,295 B2
(45) Date of Patent: Jun. 7, 2005

(54) WIRELESS INFORMATION DEVICE WITH ITS TRANSMISSION POWER LEVEL ADJUSTABLE

(76) Inventor: Tai-Her Yang, No. 59, Chung Hsiao 8 St., Si-Hu Town, Dzan-Hwa (TW)

( * ) Notice: Subject to any disclaimer, the term of this patent is extended or adjusted under 35 U.S.C. 154(b) by 483 days.

(21) Appl. No.: 10/212,080

(22) Filed: Aug. 6, 2002

(65) Prior Publication Data

US 2004/0203988 A1 Oct. 14, 2004

Related U.S. Application Data

(63) Continuation-in-part of application No. 10/166,176, filed on Jun. 11, 2002.

(51) Int. Cl.$^7$ ................................................ H04Q 7/20
(52) U.S. Cl. ...................... 455/522; 455/67.13; 455/69
(58) Field of Search ....................... 455/522, 69, 67.13, 455/127.3, 24, 116, 70; 375/297, 345

(56) References Cited

U.S. PATENT DOCUMENTS

| | | | | |
|---|---|---|---|---|
| 6,330,455 | B1 | * 12/2001 | Ichihara | .................... 455/522 |
| 6,389,272 | B1 | * 5/2002 | Horigome et al. | ........ 455/234.1 |
| 6,675,000 | B1 | * 1/2004 | Ichikawa | ................. 455/127.3 |
| 2002/0052215 | A1 | * 5/2002 | Conti et al. | ................. 455/522 |
| 2002/0176513 | A1 | * 11/2002 | Gouessant et al. | .......... 375/297 |
| 2003/0128740 | A1 | * 7/2003 | Iwamoto et al. | ............ 375/130 |
| 2003/0194028 | A1 | * 10/2003 | Jeffers et al. | ................ 375/345 |

* cited by examiner

*Primary Examiner*—Nick Corsaro
*Assistant Examiner*—Tan Trinh
(74) *Attorney, Agent, or Firm*—Rabin & Berdo, P.C.

(57) ABSTRACT

A wireless information device with its transmission power level adjustable, the drive voltage or power amplification factor associate circuit of the transmission device is adjusted depending on the communication signal strength required by the communication range and environment to select the drive voltage required by the operation of or the power amplification factor for transmission control of the transmission device, thus to avoid waste of electric power due to excessive strength of communication signal.

17 Claims, 6 Drawing Sheets

WIRELESS INFORMATION DEVICE WITH ITS TRANSMISSION POWER LEVEL ADJUSTABLE

CROSS-REFERENCES TO RELATED APPLICATIONS

This application is a Continuation-In-Part of my patent application, Ser. No. 10/166,176, filed Jun. 11, 2002.

BACKGROUND OF THE INVENTION

1. (a) Field of the Invention

The present invention is related to a wireless information device with its transmission power level adjustable, and more particularly, to one that is designed to eliminate those defectives found with the conventional wireless data process and communication peripherals to be described later, essentially by allowing the user depending on the communication power desired to select the working drive voltage or power amplification factor as needed by the transmission device.

2. (b) Description of the Prior Art

The conventional wireless data process and communication peripherals, e.g. mouse, keyboard, scanner, microphone, speaker, wireless RC, wireless Internet connection device, wireless phone, wireless detection device or wireless alarm device, operate essentially by RF electromagnetic wave or ultrasonic wave wireless communication for achieving more convenient communication. Within, the recent blue tooth technology has become an index of the wireless communication. However, the stored power of the portable source of any of those wireless communication devices is limited; and both of their drive and transmission circuits operate so far at a fixed and single working voltage level which then varies depending on the strength of the signal. Under operating conditions feature variable distance between the transmission and the receiving devices and drastic fluctuating communication environment, and a fixed drive voltage or a fixed power amplification factor being used to emit signals, the power generated in case of shorter range of communication usually is larger than as needed, resulting in waste of electric power and shorter power supply in subsequent communication.

SUMMARY OF THE INVENTION

The primary purpose of the present invention is to provide a wireless information device with its transmission power level adjustable. Depending on the communication signal strength required by the communication range and environment, the drive voltage or power amplification factor associate circuit of the transmission device is adjusted to select the drive voltage required by the operation of or the power amplification factor for transmission control of the transmission device, thus to avoid waste of electric power due to excessive strength of communication signal.

DETAILED DESCRIPTION OF THE PREFERRED EMBODIMENTS

Figure 1:
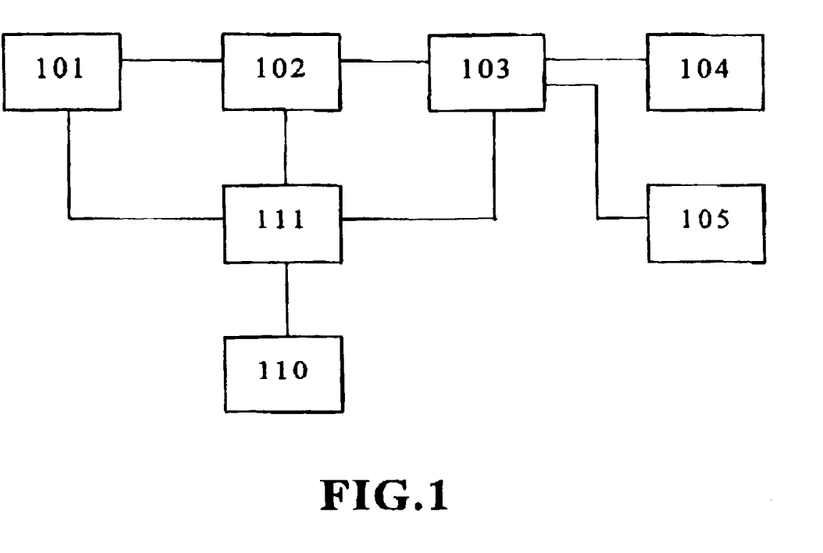
FIG. 1 is an equipotential block chart of a wireless information device of the present invention with its transmission power level adjustable.

Referring to FIG. 1 for an equipotential block chart of a wireless information device of the present invention with its transmission power level adjustable. Wherein, the present invention is essentially comprised of:

A transmission/receiving circuit device 101: related to an IC or solid status electronic device or mechanical-electronic device using RF electromagnetic wave, optical (e.g. infrared) or ultra sonic wave transmission means selected as desired to from in to relative transmission or receiving or transmission and receiving circuit device; or two or more than two communication means are provided at the same time;

An amplification circuit 102: to amplify electric signal received by the transmission/receiving circuit 101 for outputting to a local peripheral interface circuit 103, or to amplify electric signal of the local peripheral interface circuit 103 then output the signal to the transmission/receiving circuit 101 for transmission; or to provide said both amplification functions at the same time; characterized by that its transmission power may be adjusted by manual control of transmission drive voltage or amplification power factor, or both of the transmission and receiving circuits being provided with its transmission drive voltage or amplification power factor adjustable; and the amplification circuit 102 is an optional as required by system;

A local peripheral interface circuit 103: related to a dedicated circuit comprised of selected electronic circuit device depending on the function of the wireless data process or communication peripheral device to serve as an intermediate interface circuit between the transmission/receiving circuit device 101 or the amplification circuit 102 and an input device 104 or an output device 105; and the local peripheral interface circuit 103 is an optional as required by system;

An input device 104: comprised of a detector and its associate electronic and electro mechanical devices to convert one type of more than one type of optical, audio, thermal, electric, or mechanical displacement or static induction, or other physical or chemical changes into pulse or digital or analog electric signals for outputs to the local peripheral interface circuit 103, or for direct output to the amplification circuit 102; and the input device 104 is an optional as required by system;

An output device 105: comprised of mechano-electronic or solid-state electronic device or display device and its associate mechanism to convert electric signal from the local peripheral interface circuit 103 or the amplification circuit 102 into a specific electric signal or into an output in the form of optical information, video information, audio information or mechanical displace or thermal state, or other physical or chemical output; and the output device 105 is an optional as required by system; and A power supply 110: comprised of one or more than one DC battery including disposable primary battery, or dischargeable battery or battery capacitor, or super capacitor; characterized by that an output voltage control device 111 comprised of mechano-electronic device or solid-state electronic device may be provided to execute control and adjustment of voltage setup by manual or as required by input or output status so to change its output voltage for linear or stepped voltage rise or drop.

Figure 2:
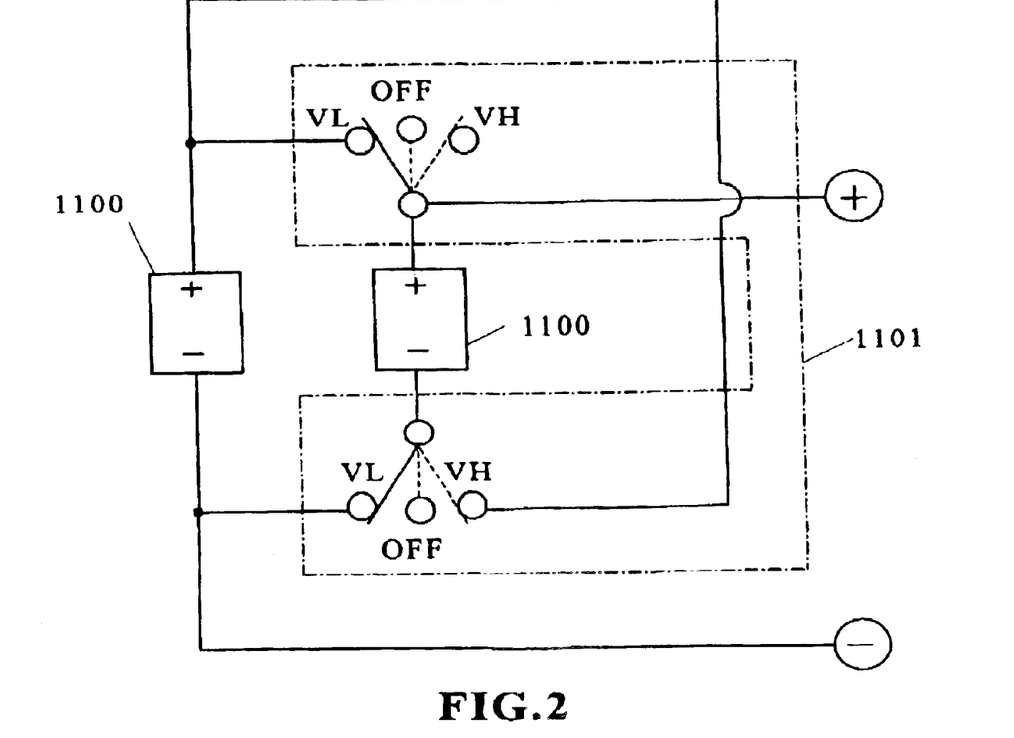
FIG. 2 is a circuit block chart showing a voltage change over switch of the present invention.
Figure 3:
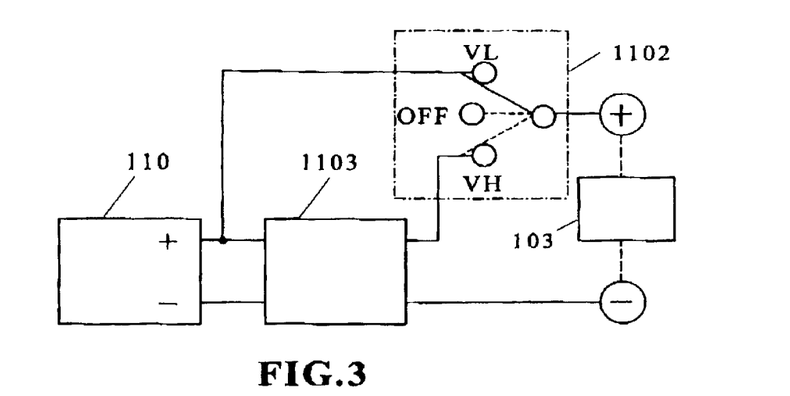
FIG. 3 is a circuit block chart of a source voltage of the present invention comprised of a converter circuit device.
Figure 4:
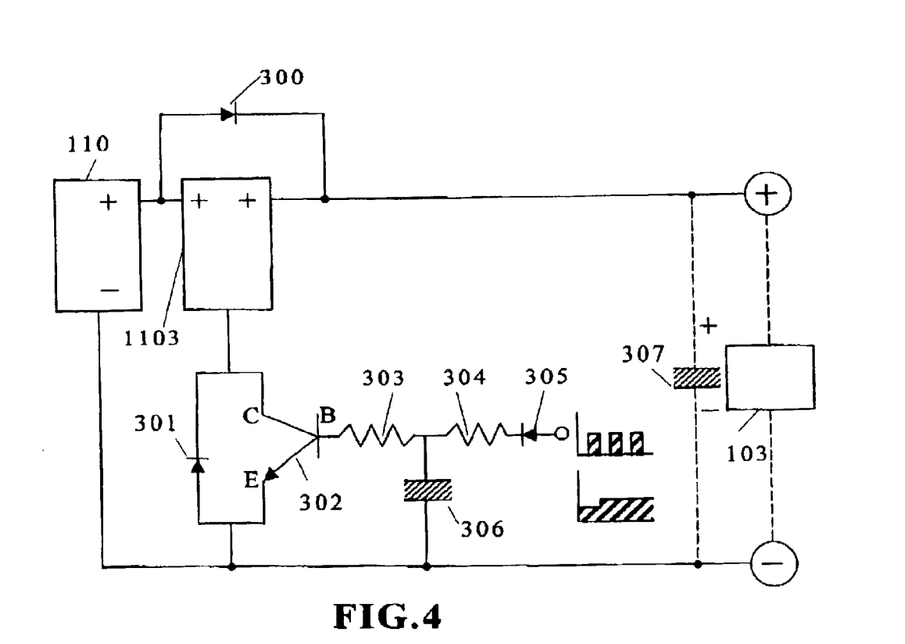
FIG. 4 is a schematic view showing that a voltage rise/fall control circuit of the present invention comprised of a converter circuit device adapted with a signal feedback controlled solid status linear or switching device.

Said output voltage control device 111 adapted to the power supply 110 includes:

(1) A solid-state or mechano-electronic switch 1101 to execute control and adjustment of voltage in series or in parallel with at least two DC batteries 1100: as illustrated in FIG. 2 for a circuit block chart showing a voltage change over switch of the present invention in case of a power supply comprised of a plurality of battery is used, the mechano-electronic or solid-state switch 1101 is further provided to switch series or parallel connection status of the batteries by manual, or to execute control and adjustment of the voltage setup depending on the input or output status so to change its output voltage, thus to further change its drive voltage of associate transmission or receiving circuit provided by the switch 1101, or to execute switch in series or in parallel by operating the switch 1101 when dischargeable batteries are used for the control and adjustment of charging voltage of its matching dischargeable battery; or (2) A voltage rise/drop control circuit comprised of converter 1103: as illustrated in FIG. 3 for a circuit block chart of a source voltage of the present invention comprised of a converter circuit device, wherein, the converter 1103 comprised of a solid-state switching device and its associate circuit device is provided to convert DC voltage into a one-way or two-way pulse voltage, which is then verified for DC output through voltage rise or drop by means of an AC adapter, and finally, a mechano-electronic or solid-state switch 1102 is used to execute control and adjustment of voltage setup by manual switching or as required by input or output status so to provide source voltage to the local peripheral interface circuit 103; or comprised of solid-state switching device and related circuit device to execute chopper control for DC voltage thus to change its mean output voltage; or (3) A voltage rise/fall control circuit comprised of the converter 1103 adapted with signal feedback controlled solid-state linear or switching device. As illustrated in FIG. 4, showing that a voltage rise/fall control circuit of the present invention comprised of a converter circuit device adapted with a signal feedback controlled solid status linear or switching device, wherein, the converter 1103 comprised of solid-state linear or switching device and related circuit device is used to convert DC voltage into one-way or two-way pulse voltage, then the voltage is risen or dropped through an AC transformer before being rectified into DC output; an active device 302 comprised of a mechanical-electronic or a solid-state switching device is connected in series between a common negative pin (or a positive pin) in a conversion circuit and a negative pin (or a positive pin) of the power supply 110, so to be controlled by the electric energy of signal or pulse signal relatively risen during transmission or receiving to drive an active device 302 for conduction, thus to further control converter 1103 to rise the source voltage supplied to the local peripheral interface circuit 103; meanwhile, a collecting electrode C and an emission electrode E from the active device 302 are provided to be connected in series at where between a common pin of the input and the output of the converter 1103 and the power supply 110; a base electrode B from the active device 302 is connected to a series circuit formed by two limiting resistors 303, 304 and an isolation diode 305, and connected in parallel by means of a capacitor 306 at where between series connection and negative electrode of those two limiting resistors 303, 304 to receive signal or pulse signal electric energy relatively risen during the transmission or receiving as inputted by the isolation diode 305 to control the active device 302 for conduction, and further to drive the converter 1103 to rise the source voltage supplied to the local peripheral interface circuit 103; and a diode 300 is connected on the same direction at where between the input and output of the positive electrode (or the negative electrode) from the converter 1103 for the power supply 110 to directly supply power to the load.

A source loop is formed on the output side by having a diode 301 connected in parallel in reverse at where between the collecting electrode E and the emission electrode E from the active device 302.

As required, a capacitor 307 may be connected in parallel with the output of the converter 1103 to stabilize the voltage at the output.

The active device 302 maybe substituted with various composite amplification circuits (IC or Chip) provided with amplifying function or field effect transistor (MOSFET) or any other amplification circuit.

Figure 5:
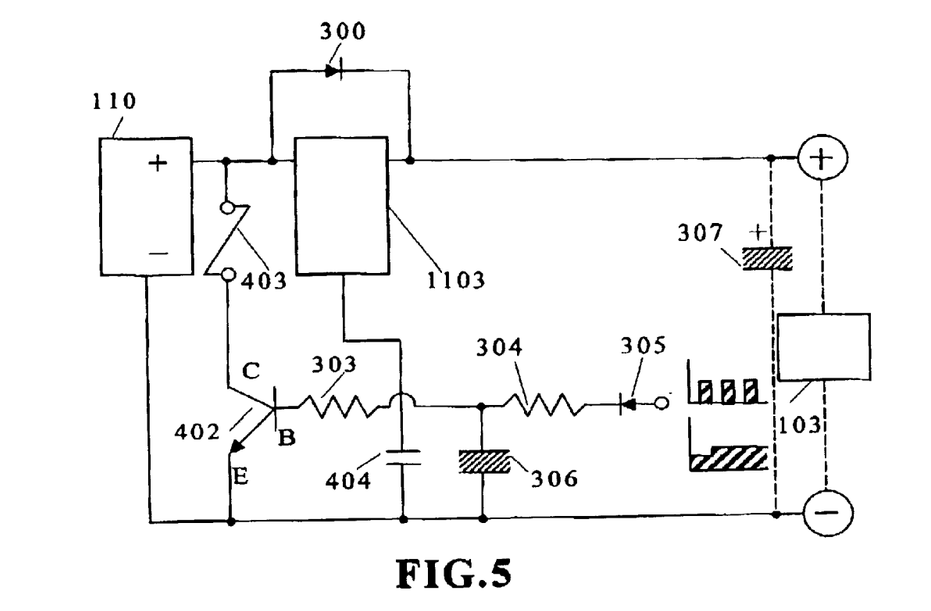
FIG. 5 is a schematic view showing that a voltage rise/fall control circuit of the present invention comprised of a converter circuit device adapted with a signal feedback controlled relay.

(4) A voltage rise/fall control circuit comprised of the converter 1103 adapted with signal feedback controlled relay. As illustrated in FIG. 5, showing that a voltage rise/fall control circuit of the present invention comprised of a converter circuit device adapted with a signal feedback controlled relay, wherein, the converter 1103 comprised of solid-state linear or switching device and related circuit device is used to convert DC voltage into one-way or two-way pulse voltage, then the voltage is risen or dropped through an AC transformer before being rectified into DC output; a constant open connection 404 driven by a relay coil 403 is connected in series between a common negative pin (or a positive pin) in a conversion circuit and a negative pin (or a positive pin) of the power supply 110, the relay coil 403 is connected first in series with a collecting electrode C and an emission electrode E from a control transistor 402, then is connected in parallel with both outputs of the power supply 110, so to be controlled by the electric energy of signal or pulse signal relatively risen during transmission or receiving to drive the control transistor 402, and further to control the relay coil 403 to drive in turn the constant open connection 404 to be closed for the converter 1103 to rise the source voltage supplied to the local peripheral interface circuit 103; meanwhile, a base electrode B of the control transistor 402 is connected to a series circuit formed by those two limiting resistors 303, 304 and the isolation diode 305, and connected in parallel by means of the capacitor 306 at where between series connection and negative electrode of those two limiting resistors 303, 304 to receive signal or pulse signal electric energy relatively risen during the transmission or receiving as inputted by the isolation diode 305 to control the relay coil 403, and further to close its constant open connection 404 to drive the converter 1103 to rise the source voltage supplied to the local peripheral interface circuit 103; and the diode 300 is connected on the same direction at where between the input and output of the positive electrode (or the negative electrode) from the converter 1103 for the power supply 110 to directly supply power to the load. As required, a capacitor 307 may be connected in parallel with the output of the converter 1103 to stabilize the voltage at the output.

Figure 6:
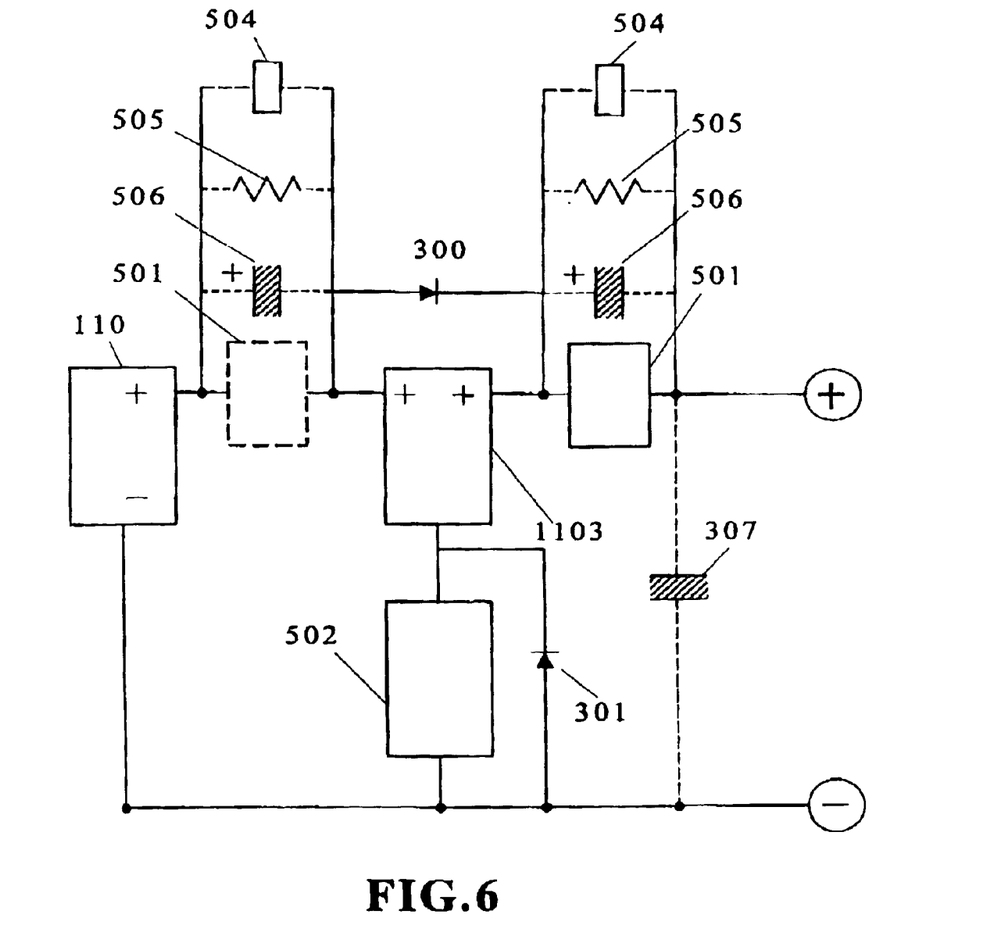
FIG. 6 is a schematic view showing that a voltage rise/fall control circuit of the present invention comprised of a converter circuit device adapted with a current detector and a solid-state linear or switching device driven by the current detector.

The transistor 402 maybe substituted with various composite amplification circuits (IC or Chip) provided with amplifying function or field effect transistor (MOSFET) or any other amplification circuit; or (5) A voltage rise/fall control circuit comprised of the converter 1103 adapted with a current detector and a solid-state linear or switching device driven by the current detector. As illustrated in FIG. 6, showing that a voltage rise/fall control circuit of the present invention is comprised of a converter circuit device adapted with a current detector and a solid-state linear or switching device driven by the current detector, wherein, the converter 1103 comprised of a solid status linear or switching device and related circuit device is used to convert DC voltage into one-way or two-way pulse voltage, then the voltage is risen or dropped by means of an AC transformer before being rectified into DC output; both of a current detection device 501 and an active device 502 coupled to the current detection device 501 and comprised of mechanical-electronic switching device or solid-state switching device or solid-state linear transistor may be separately structured then coupled to each other or made integrated; and the active device 502 is controlled by the current detection device 501, then both of the active device 502 and the current detection device 501 jointly control the output voltage from the converter 1103; wherein, the current detection device 501 relates to a device that is capable of converting current into optical energy, or converting current into voltage, or converting current into magnetic energy or any other device that is capable of converting amperage into relatively physical message, the current detection device 501 is connected in series with the output (or input) of the converter 1103, and the active device 502 relatively coupled to the current detection device 501 is connected in series at where between the common negative pin (or positive pin) of the input and output of the converter and the negative pin (or positive pin) of the power supply 110; and the diode 300 is connected on the same direction at where between the input and output of the positive electrode (or the negative electrode) from the converter 1103.

A source loop is formed on the output side of the converter 1103 by having a diode 301 connected in parallel in reverse at where between both ends of the active device 502. Furthermore, as required, both ends of the current detection device 501 may be connected in parallel with a capacitor 506, or a dividing resistor 505, or a diode 504 provided with Gina voltage effect to limit voltage, or any of them or any of their combination.

As required, a capacitor 307 may be connected in parallel with the output of the converter 1103 to stabilize the voltage at the output.

Figure 7:
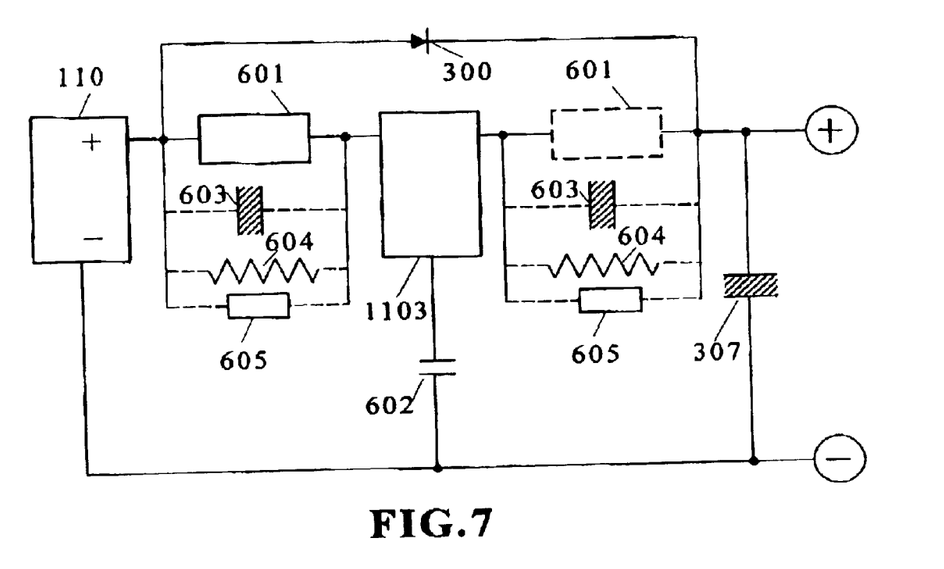
FIG. 7 is a schematic view showing that a voltage regulation and control circuit of the present invention comprised of a converter circuit device adapted with a current detection coil and connection driven by the coil.

(6) A voltage rise/fall control circuit comprised of the converter 1103 adapted with a current detector coil and connection driven by the coil. As illustrated in FIG. 7, showing that a voltage regulation and control circuit of the present invention comprised of a converter circuit device adapted with a current detection coil and connection driven by the coil, wherein, the converter 1103 comprised of a solid status linear or switching device and related circuit device is used to convert DC voltage into one-way or two-way pulse voltage, then the voltage is risen or dropped by means of an AC transformer before being rectified into DC output; both of the current detection coil 601 and the connection 602 maybe separately structured or integrated, the connection 602 is controlled by the current detection coil 601, then both of the connection 602 and the current detection coil 601 jointly control the output voltage from the converter 1103, wherein, as required, the current detection coil 601 may be connected in series with the output or the input of the converter 1103, and the connection 602 controlled by the current detection coil 601 is connected in series at where between the common negative pin (or positive pin) of the input and output of the converter 1103 and the negative electrode (or the positive electrode) of the power supply 110; meanwhile, the diode 300 is connected on the same direction at where between the input and output of the positive electrode (or the negative electrode) from the converter 1103.

As required, both ends of the current detection coil 601 may be connected in parallel with a capacitor 603, or a dividing resistor 604, or a diode 605 provided with Gina voltage effect to limit voltage, or any of them or any of their combination.

As required, a capacitor 307 may be connected in parallel with the output of the converter 1103 to stabilize the voltage at the output.

Figure 8:
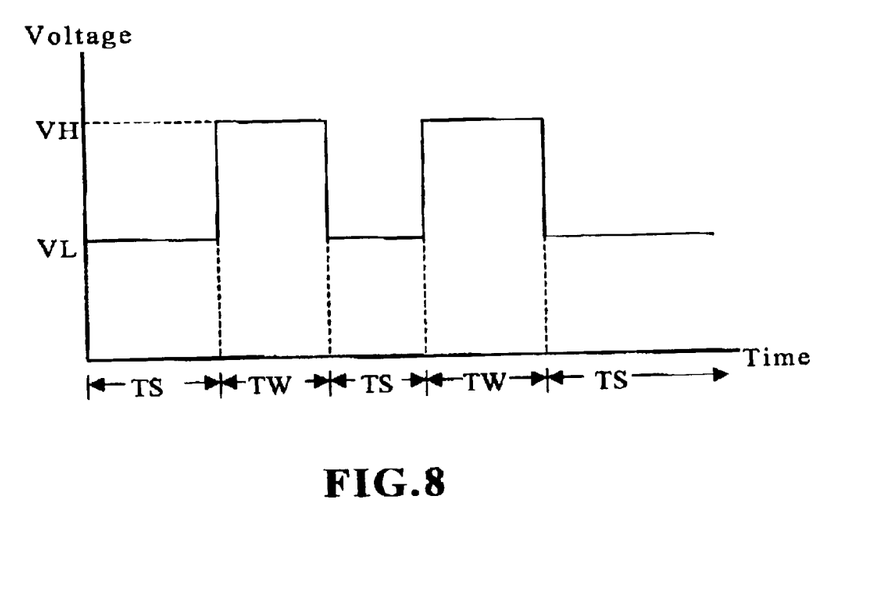
FIG. 8 is a schematic view showing a status of the source supply of the present invention at lower level stand-by voltage and higher transmission or receiving voltage.
Figure 9:
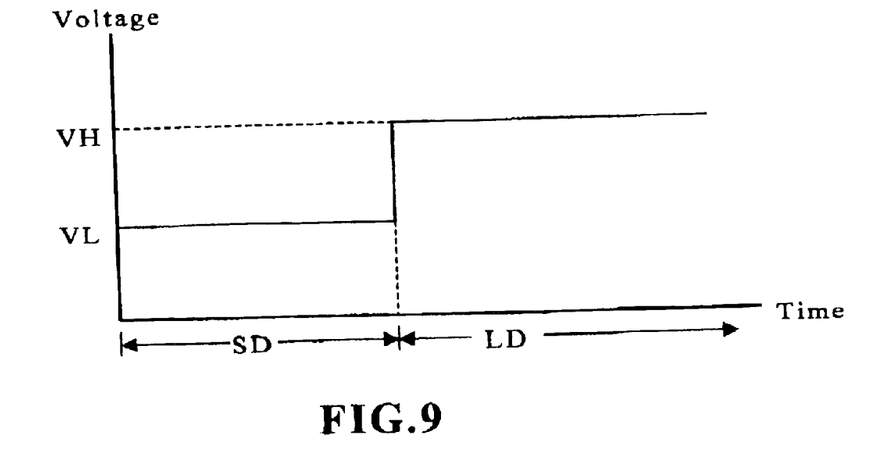
FIG. 9 is a schematic view showing a source supply status of the present invention by manual operation in selecting various transmission voltages depending on the range of communication.

Control and operation methods for the wireless information device with its transmission power level adjustable of the present invention include:

1. The output voltage from the power supply 110 is controlled and adjusted to the power supply status featuring lower voltage VL during stand-by time TS and higher voltage VH during transmission or receiving time TW by operation and control of the transmission/receiving circuit device 101 or by the local peripheral interface circuit 103 or the input device 104 as illustrated in FIG. 8 for a schematic view showing a status of the source supply of the present invention at lower level stand-by voltage and higher transmission or receiving voltage; or 2. A lower driver voltage VL is selected for transmission or receiving function in SD status upon approaching a communication range by manual control and operation while a higher drive voltage VH is selected for transmission or receiving function in LD status upon leaving away the communication range for a longer distance as illustrated in FIG. 9 for a schematic view showing a source supply status of the present invention by manual operation in selecting various transmission voltage depending on the range of communication; or 3. The drive voltage is upgraded by manual to function as a booster for transmission power; or
4. The amplification ratio of the amplification circuit 102 is controlled and adjusted for a smaller value upon approaching the communication range; and for a greater value upon leaving away from the communication range by manual control and operation; or
5. The selected source voltage is controlled and adjusted by manual depending on the length and environment of the communication range; or
6. The adapted amplification circuit 102 is selected to provide a fixed amplification ratio while being selected by the power supply 110 to provide the function of control and adjustment of the drive voltage; or
7. The adapted amplification circuit 102 is selected to provide the function of control and adjustment of the drive voltage while the power supply 110 is selected to provide a fixed drive voltage; or
8. The adapted amplification circuit 102 is selected to provide the function of control and adjustment of the drive voltage while the power supply 110 is provided at the same time with the function of control and adjustment of the drive voltage; and both of the amplification circuit 102 and the power supply 110 may be controlled and operated separately from each other or in synchronized ratio by a preset interaction relation; or
9. The amplification ratio of the amplification circuit 102 is controlled and adjusted for a lower driver voltage and a smaller value upon approaching the communication range; and for a higher voltage and a greater value upon leaving away from the communication range by manual control and operation.

As disclosed, the wireless information device with its transmission power level adjustable of the present invention for providing the following advantages:

To reduce the interference upon EM environment by the transmission power resulted from excessive strength of the communication signal; and To save power consumption for longer stand-by time and operation time.

The present invention is innovative with precise and well-defined function, therefore a patent is duly filed accordingly.

What is claimed is:

1. A wireless information device with its transmission power level adjustable, wherein, depending on the communication signal strength required by the communication range and environment, the drive voltage or power amplification factor associate circuit of the transmission device is adjusted to select the drive voltage required by the operation of or the power amplification factor for transmission control of the transmission device, thus to avoid waste of electric power due to excessive strength of communication signal, is essentially comprised of:

a transmission/receiving circuit device 101: related to an IC or solid status electronic device or mechanical-electronic device using RF electromagnetic wave, optical (e.g. infrared) or ultra sonic wave transmission means selected as desired to from into relative transmission or receiving or transmission and receiving circuit device; or two or more than two communication means are provided at the same time;

an amplification circuit 102: to amplify electric signal received by the transmission/receiving circuit 101 for outputting to a local peripheral interface circuit 103, or to amplify electric signal of the local peripheral interface circuit 103 then output the signal to the transmission/receiving circuit 101 for transmission; or to provide said both amplification functions at the same time; characterized by that its transmission power may be adjusted by manual control of transmission drive voltage or amplification power factor, or both of the transmission and receiving circuits being provided with its transmission drive voltage or amplification power factor adjustable; and the amplification circuit 102 is an optional as required by system;

a local peripheral interface circuit 103: related to a dedicated circuit comprised of selected electronic circuit device depending on the function of the wireless data processor communication peripheral device to serve as an intermediate interface circuit between the transmission/receiving circuit device 101 or the amplification circuit 102 and an input device 104 or an output device 105; and the local peripheral interface circuit 103 is an optional as required by system;

an input device 104: comprised of a detector and its associate electronic and electro mechanical devices to convert one type of more than one type of optical, audio, thermal, electric, or mechanical displacement or static induction, or other physical or chemical changes into pulse or digital or analog electric signals for outputs to the local peripheral interface circuit 103, or for direct output to the amplification circuit 102; and the input device 104 is an optional as required by system;

an output device 105: comprised of mechano-electronic or solid-state electronic device or display device and its associate mechanism to convert electric signal from the local peripheral interface circuit 103 or the amplification circuit 102 into a specific electric signal or into an output in the form of optical information, video information, audio information or mechanical displace or thermal state, or other physical or chemical output; and the output device 105 is an optional as required by system; and a power supply 110: comprised of one or more than one DC battery including disposable primary battery, or dischargeable battery or battery capacitor, or super capacitor; characterized by that an output voltage control device 111 comprised of mechano-electronic device or solid-state electronic device may be provided to execute control and adjustment of voltage setup by manual or as required by input or output status so to change its output voltage for linear or stepped voltage rise or drop.

2. A wireless information device with its transmission power level adjustable as claimed in claim 1, wherein, the output voltage control device 111 of the power supply 110 includes a solid-state or mechano-electronic switch 1101 to execute control and adjustment of voltage in series or in parallel with at least two DC batteries 1100, the mechano-electronic or solid-state switch 1101 is further provided to switch series or parallel connection status of the batteries by manual, or to execute control and adjustment of the voltage setup depending on the input or output status so to change its output voltage, thus to further change its drive voltage of associate transmission or receiving circuit provided by the switch 1101, or to execute switch in series or in parallel by operating the switch 1101 when dischargeable batteries are used for the control and adjustment of charging voltage of its matching dischargeable battery.

3. A wireless information device with its transmission power level adjustable as claimed in claim 1, wherein, the output voltage control and adjustment device 111 of the power supply 110 includes a voltage rise/drop control circuit converter 1103, comprised of a solid-state switching device and its associate circuit device is provided to convert DC voltage into a one-way or two-way pulse voltage, which is then verified for DC output through voltage rise or drop by means of an AC adapter, and finally, a mechano-electronic or solid-state switch 1102 is used to execute control and adjustment of voltage setup by manual switching or as required by input or output status so to supply source voltage to a local peripheral interface circuit 103.

4. A wireless information device with its transmission power level adjustable as claimed in claim 1, wherein, the output voltage control and adjustment device 111 of the power supply 110 includes a chopper voltage control circuit comprised of a solid-state switching device and its associate circuit device to execute chopper control for the DC voltage thus to change its average output voltage.

5. A wireless information device with its transmission power level adjustable as claimed in claim 1, wherein, the output voltage control and adjustment device 111 of the power supply 110 includes: a voltage rise/fall control circuit comprised of the converter 1103 comprised of solid-state linear or switching device and related circuit device is used to convert DC voltage into one-way or two-way pulse voltage, then the voltage is risen or dropped through an AC transformer before being rectified into DC output; an active device 302 comprised of a electronic-electronic or a solid-state switching device is connected in series between a common negative pin (or a positive pin) in a conversion circuit and a negative pin (or a positive pin) of the power supply 110, so to be controlled by the electric energy of signal or pulse signal relatively risen during transmission or receiving to drive an active device 302 for conduction, thus to further control converter 1103 to rise the source voltage supplied to the local peripheral interface circuit 103; meanwhile, a collecting electrode C and an emission electrode E from the active device 302 are provided to be connected in series at where between a common pin of the input and the output of the converter 1103 and the power supply 110; a base electrode B from the active device 302 is connected to a series circuit formed by two limiting resistors 303, 304 and an isolation diode 305, and connected in parallel by means of a capacitor 306 at where between series connection and negative electrode of those two limiting resistors 303, 304 to receive signal or pulse signal electric energy relatively risen during the transmission or receiving as inputted by the isolation diode 305 to control the active device 302 for conduction, and further to drive the converter 1103 to rise the source voltage supplied to the local peripheral interface circuit 103; and a diode 300 is connected on the same direction at where between the input and output of the positive electrode (or the negative electrode) from the converter 1103 for the power supply 110 to directly supply power to the load; a source loop is formed on the output side by having a diode 301 connected in parallel in reverse at where between the collecting electrode E and the emission electrode E from the active device 302; as required, a capacitor 307 may be connected in parallel with the output of the converter 1103 to stabilize the voltage at the output; and the active device 302 may be substituted with various composite amplification circuits (IC or Chip) provided with amplifying function or field effect transistor (MOSFET) or any other amplification circuit.

6. A wireless information device with its transmission power level adjustable as claimed in claim 1, wherein, the output voltage control and adjustment device 111 of the power supply 110 includes: the converter 1103 comprised of solid-state linear or switching device and related circuit device is used to convert DC voltage into one-way or two-way pulse voltage, then the voltage is risen or dropped through an AC transformer before being rectified into DC output; a constant open connection 404 driven by a relay coil 403 is connected in series between a common negative pin (or a positive pin) in a conversion circuit and a negative pin (or a positive pin) of the power supply 110, the relay coil 403 is connected first in series with a collecting electrode C and an emission electrode E from a control transistor 402, then is connected in parallel with both outputs of the power supply 110, so to be controlled by the electric energy of signal or pulse signal relatively risen during transmission or receiving to drive the control transistor 402, and further to control the relay coil 403 to drive in turn the constant open connection 404 to be closed for the converter 1103 to rise the source voltage supplied to the local peripheral interface circuit 103; meanwhile, a base electrode B of the control transistor 402 is connected to a series circuit formed by those two limiting resistors 303, 304 and the isolation diode 305, and connected in parallel by means of the capacitor 306 at where between series connection and negative electrode of those two limiting resistors 303, 304 to receive signal or pulse signal electric energy relatively risen during the transmission or receiving as inputted by the isolation diode 305 to control the relay coil 403, and further to close its constant open connection 404 to drive the converter 1103 to rise the source voltage supplied to the local peripheral interface circuit 103; and the diode 300 is connected on the same direction at where between the input and output of the positive electrode (or the negative electrode) from the converter 1103 for the power supply 110 to directly supply power to the load; as required, a capacitor 307 may be connected in parallel with the output of the converter 1103 to stabilize the voltage at the output; and the transistor 402 may be substituted with various composite amplification circuits (IC or Chip) provided with amplifying function or field effect transistor (MOSFET) or any other amplification circuit.

7. A wireless information device with its transmission power level adjustable as claimed in claim 1, wherein, the output voltage control and adjustment device 111 of the power supply 110 includes: the converter 1103 comprised of a solid status linear or switching device and related circuit device is used to convert DC voltage into one-way or two-way pulse voltage, then the voltage is risen or dropped by means of an AC transformer before being rectified into DC output; both of a current detection device 501 and an active device 502 coupled to the current detection device 501 and comprised of mechanical-electronic switching device or solid-state switching device or solid-state linear transistor may be separately structured then coupled to each other or made integrated; and the active device 502 is controlled by the current detection device 501, then both of the active device 502 and the current detection device 501 jointly control the output voltage from the converter 1103;

wherein, the current detection device 501 relates to a device that is capable of converting current into optical energy, or converting current into voltage, or converting current into magnetic energy or any other device that is capable of converting amperage into relatively physical message, the current detection device 501 is connected in series with the output (or input) of the converter 1103, and the active device 502 relatively coupled to the current detection device 501 is connected in series at where between the common negative pin (or positive pin) of the input and output of the converter and the negative pin (or positive pin) of the power supply 110; and the diode 300 is connected on the same direction at where between the input and output of the positive electrode (or the negative electrode) from the converter 1103; a source loop is formed on the output side of the converter 1103 by having a diode 301 connected in parallel in reverse at where between both ends of the active device 502; as required, both ends of the current detection device 501 maybe connected in parallel with a capacitor 506, or a dividing resistor 505, or a diode 504 provided with Gina voltage effect to limit voltage, or any of them or any of their combination; and as required, a capacitor 307 may be connected in parallel with the output of the converter 1103 to stabilize the voltage at the output.

8. A wireless information device with its transmission power level adjustable as claimed in claim 1, wherein, the output voltage control and adjustment device 111 of the power supply 110 includes: the converter 1103 comprised of a solid status linear or switching device and related circuit device is used to convert DC voltage into one-way or two-way pulse voltage, then the voltage is risen or dropped by means of an AC transformer before being rectified into DC output; both of the current detection coil 601 and the connection 602 may be separately structured or integrated, the connection 602 is controlled by the current detection coil 601, then both of the connection 602 and the current detection coil 601 jointly control the output voltage from the converter 1103, wherein, as required, the current detection coil 601 may be connected in series with the output or the input of the converter 1103, and the connection 602 controlled by the current detection coil 601 is connected in series at where between the common negative pin (or positive pin) of the input and output of the converter 1103 and the negative electrode (or the positive electrode) of the power supply 110; meanwhile, the diode 300 is connected on the same direction at where between the input and output of the positive electrode (or the negative electrode) from the converter 1103; as required, both ends of the current detection coil 601 may be connected in parallel with a capacitor 603, or a dividing resistor 604, or a diode 605 provided with Gina voltage effect to limit voltage, or any of them or any of their combination; as required, a capacitor 307 may be connected in parallel with the output of the converter 1103 to stabilize the voltage at the output.

9. A wireless information device with its transmission power level adjustable as claimed in claim 1, wherein, its control and operation methods include that the output voltage from the power supply 110 is controlled and adjusted to the power supply status featuring lower voltage VL during stand-by time TS and higher voltage VH during transmission or receiving time TW by operation and control of the transmission/receiving circuit device 101 or by the local peripheral interface circuit 103 or the input device 104.

10. A wireless information device with its transmission power level adjustable as claimed in claim 1, wherein, its control and operation methods include that a lower driver voltage VL is selected for transmission or receiving function in SD status upon approaching a communication range by manual control and operation while a higher drive voltage VH is selected for transmission or receiving function in LD status upon leaving away the communication range for a longer distance.

11. A wireless information device with its transmission power level adjustable as claimed in claim 1, wherein, its control and operation methods include that the drive voltage is upgraded by manual to function as a booster for transmission power.

12. A wireless information device with its transmission power level adjustable as claimed in claim 1, wherein, its control and operation methods include that the amplification ratio of the amplification circuit 102 is controlled and adjusted for a smaller value upon approaching the communication range; and for a greater value upon leaving away from the communication range by manual control and operation.

13. A wireless information device with its transmission power level adjustable as claimed in claim 1, wherein, its control and operation methods include that the selected source voltage is controlled and adjusted by manual depending on the length and environment of the communication range.

14. A wireless information device with its transmission power level adjustable as claimed in claim 1, wherein, its control and operation methods include that the amplification circuit 102 is selected to provide a fixed amplification ratio while being selected by the power supply 110 to provide the function of control and adjustment of the drive voltage.

15. A wireless information device with its transmission power level adjustable as claimed in claim 1, wherein, its control and operation methods include that the amplification circuit 102 is selected to provide the function of control and adjustment of the drive voltage while the power supply 110 is selected to provide a fixed drive voltage.

16. A wireless information device with its transmission power level adjustable as claimed in claim 1, wherein, its control and operation methods include that the amplification circuit 102 is selected to provide the function of control and adjustment of the drive voltage while the power supply 110 is provided at the same time with the function of control and adjustment of the drive voltage; and both of the amplification circuit 102 and the power supply 110 may be controlled and operated separately from each other or in synchronized ratio by a preset interaction relation.

17. A wireless information device with its transmission power level adjustable as claimed in claim 1, wherein, its control and operation methods include that the amplification ratio of the amplification circuit 102 is controlled and adjusted for a lower driver voltage and a smaller value upon approaching the communication range; and for a higher voltage and a greater value upon leaving away from the communication range by manual control and operation.

* * * * *